May 6, 1958 P. S. ROTHHAAR 2,833,485
FEED GRINDING AND MIXING MACHINE
Filed July 19, 1954 5 Sheets-Sheet 1

INVENTOR
P. S. Rothhaar
BY Kimmel & Crowell
ATTORNEYS

May 6, 1958 P. S. ROTHHAAR 2,833,485
FEED GRINDING AND MIXING MACHINE
Filed July 19, 1954 5 Sheets-Sheet 2
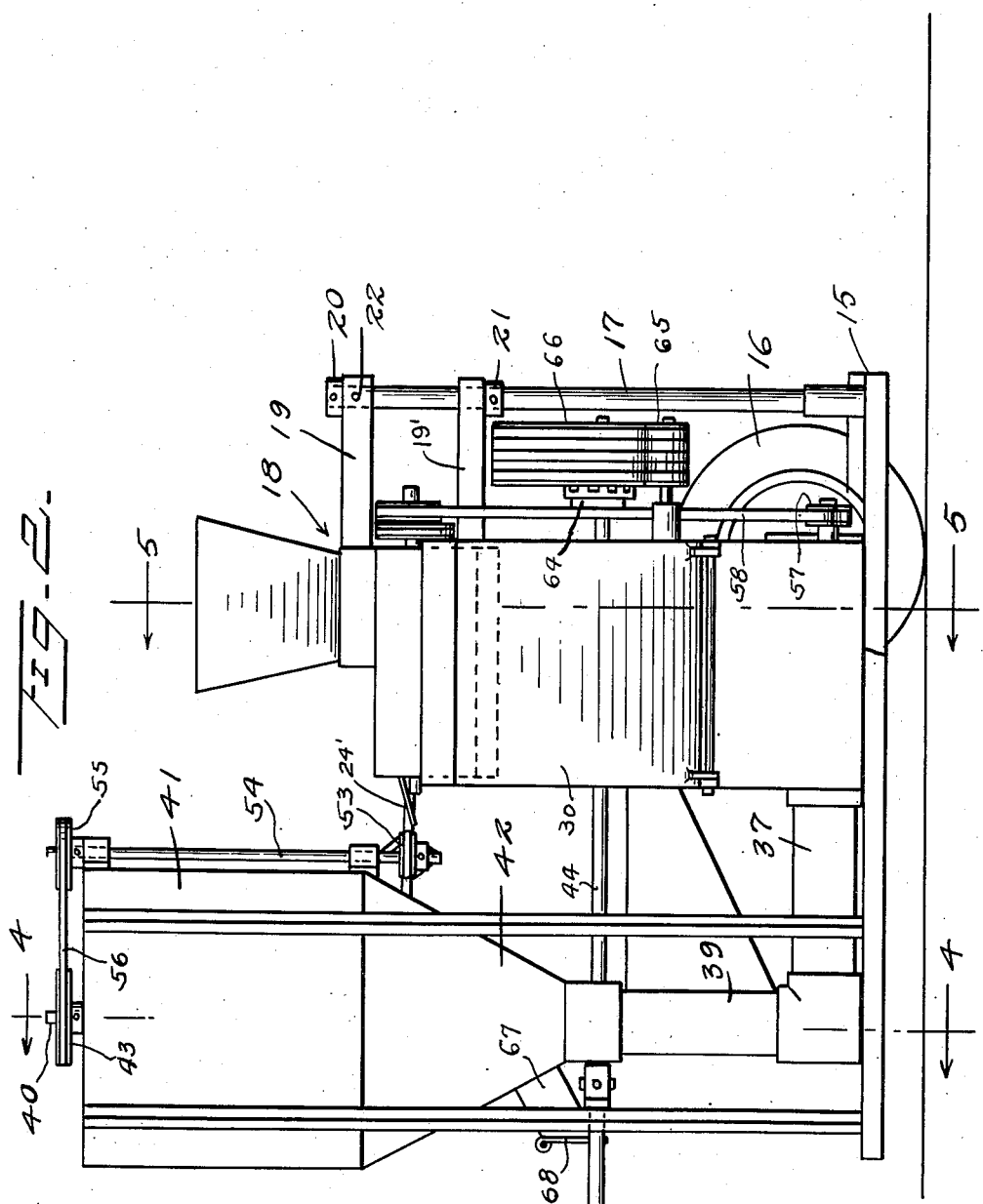
INVENTOR
P.S.Rothhaar
BY Kimmel & Crowell
ATTORNEYS

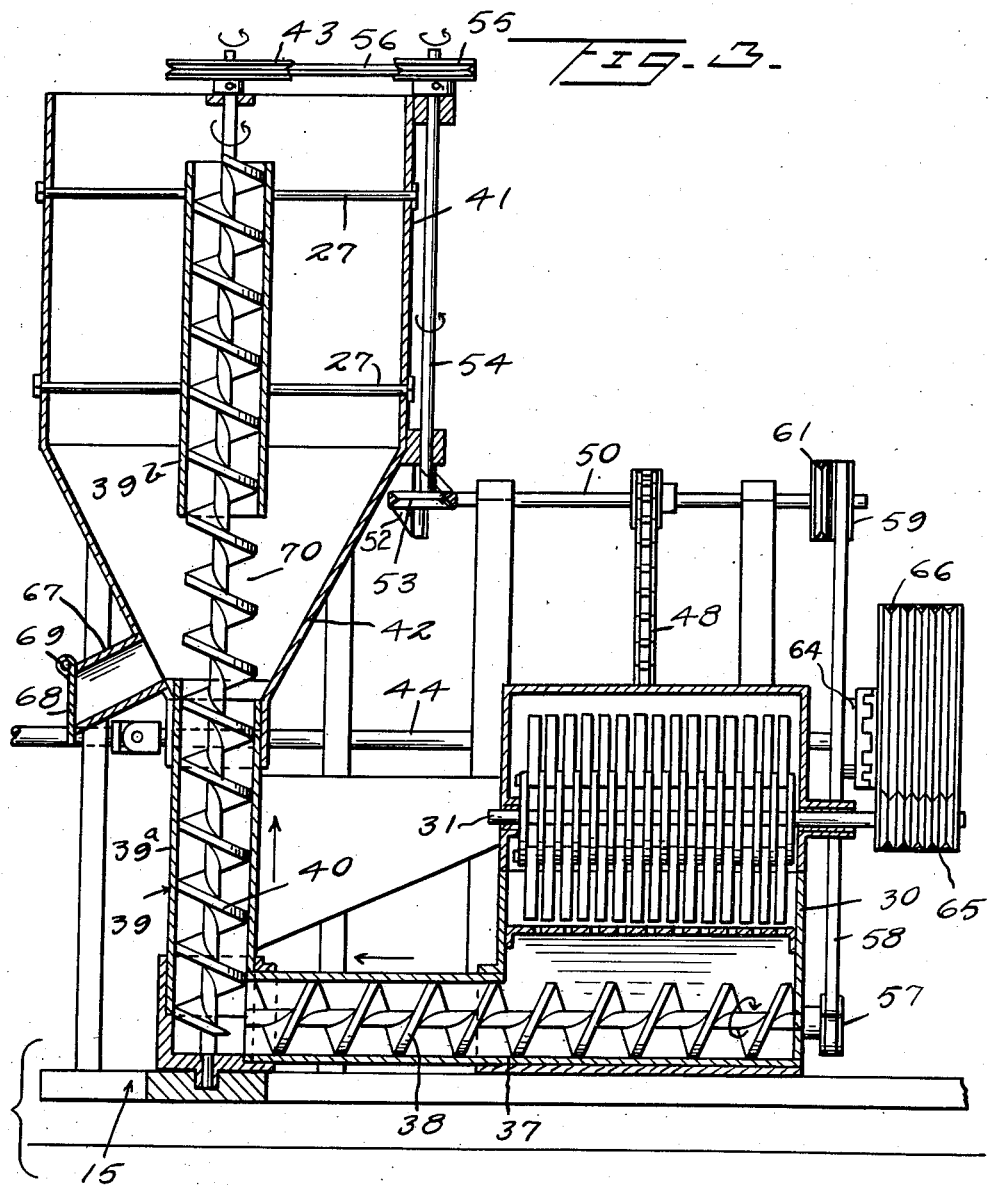

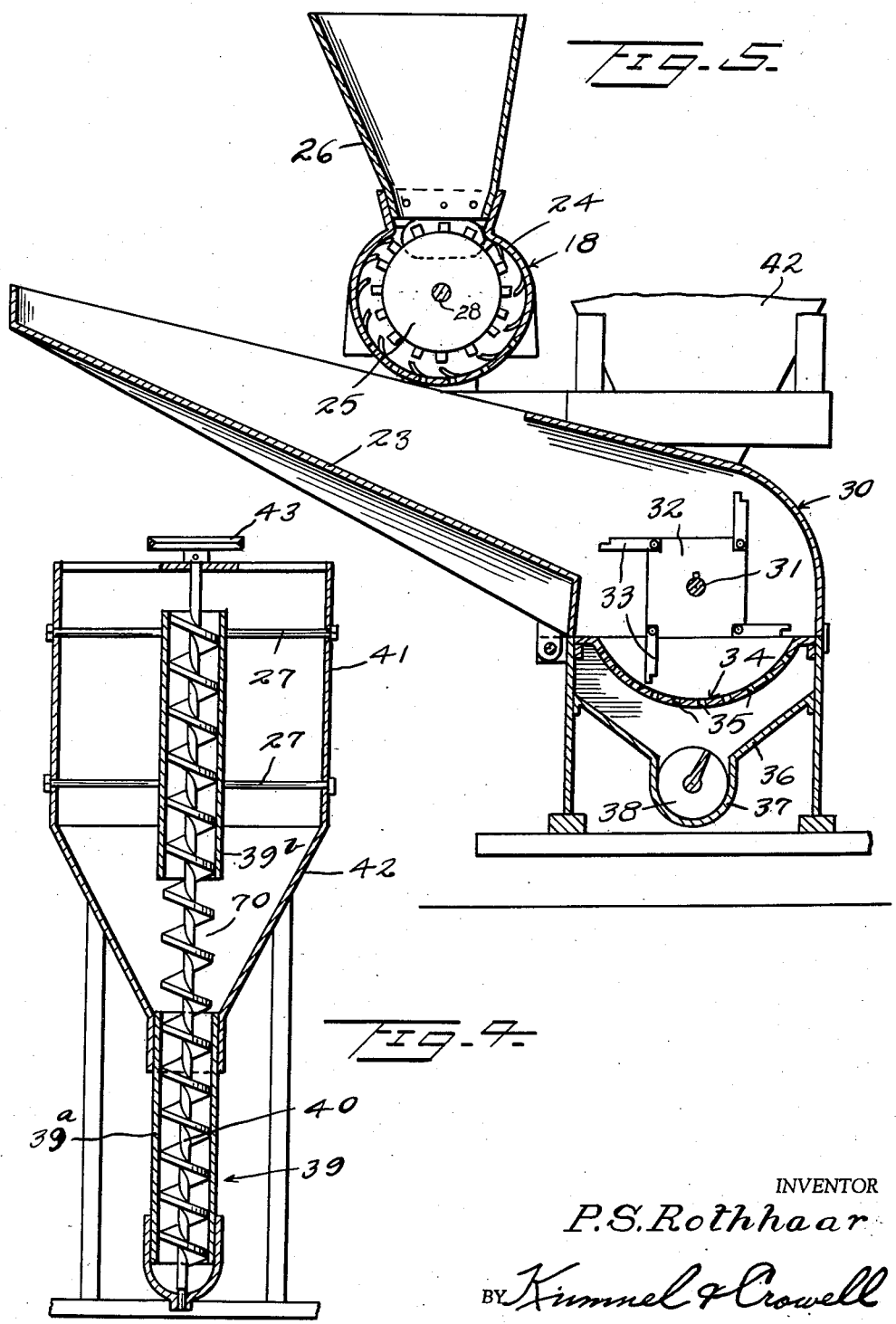

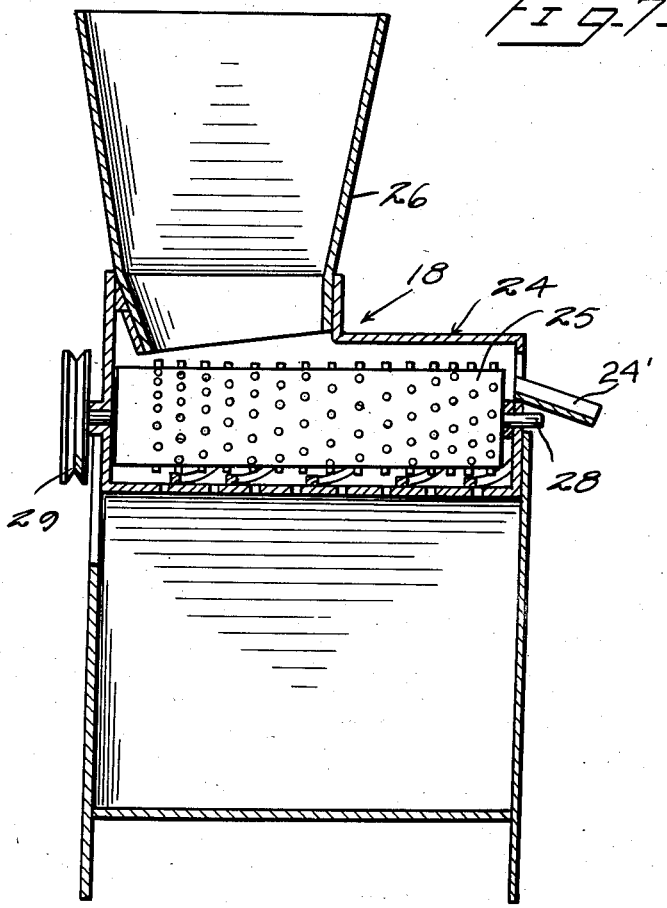
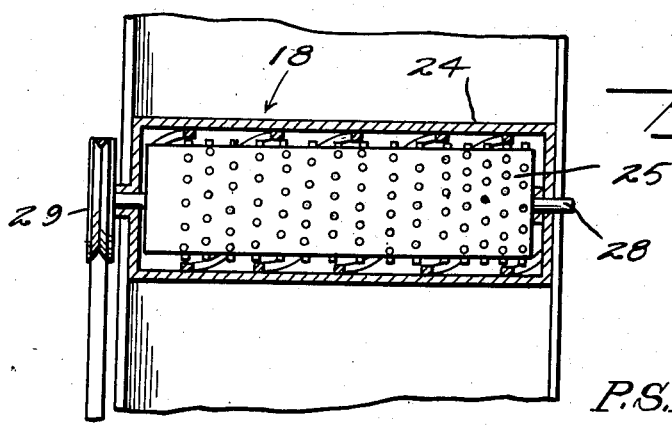

United States Patent Office 2,833,485
Patented May 6, 1958

2,833,485

FEED GRINDING AND MIXING MACHINE

Perry S. Rothhaar, Bloomville, Ohio

Application July 19, 1954, Serial No. 444,205

1 Claim. (Cl. 241—101)

This invention relates to a feed grinding and mixing machine.

An object of this invention is to provide a machine for shelling and grinding corn and mixing other feed with the corn.

Another object of this invention is to provide in combination, a corn sheller, a grinder and a combined hopper and mixer.

A further object of this invention is to provide a combination of this kind which is mounted on wheels and adapted to be connected to a tractor power take-off.

A further object of this invention is to provide a combination of this kind wherein the sheller is swingably mounted so that if desired the sheller can be swung out of the way and feed discharged directly to the grinder.

With the above and other objects in view, my invention consists in the arrangement, combination and details of construction disclosed in the drawings and specification, and then more particularly pointed out in the appended claim.

In the drawings:

Figure 2 is a detailed side elevation of the machine.

Figure 3 is a sectional view taken on the line 3—3 of Figure 1.

Figure 4 is a fragmentary sectional view taken on the line 4—4 of Figure 2.

Figure 5 is a sectional view taken on the line 5—5 of Figure 2.

Figure 7 is a fragmentary sectional view taken on the line 7—7 of Figure 1.

Figure 8 is a fragmentary sectional view taken on the line 8—8 of Figure 1.

Figure 1:
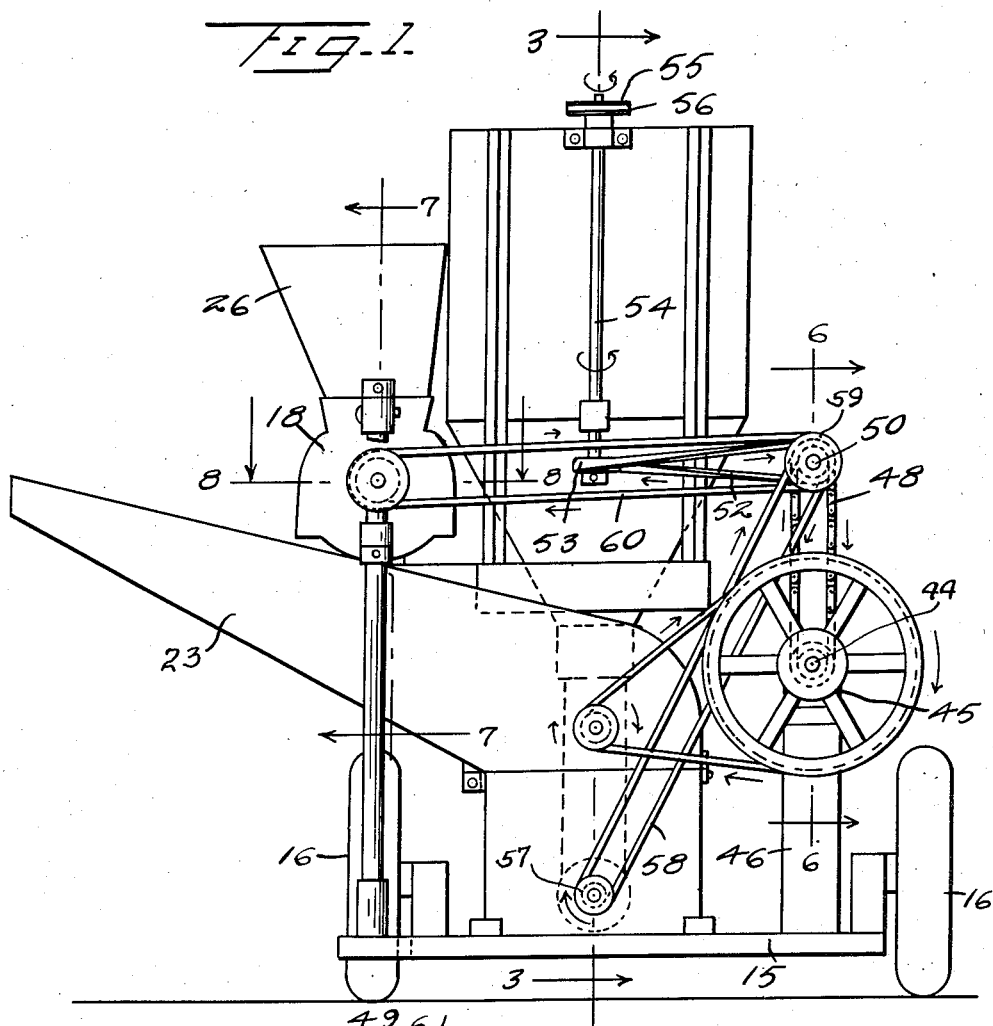
Figure 1 is a detailed rear elevation of a feed grinding and mixing machine constructed according to an embodiment of this invention.
Figure 6:
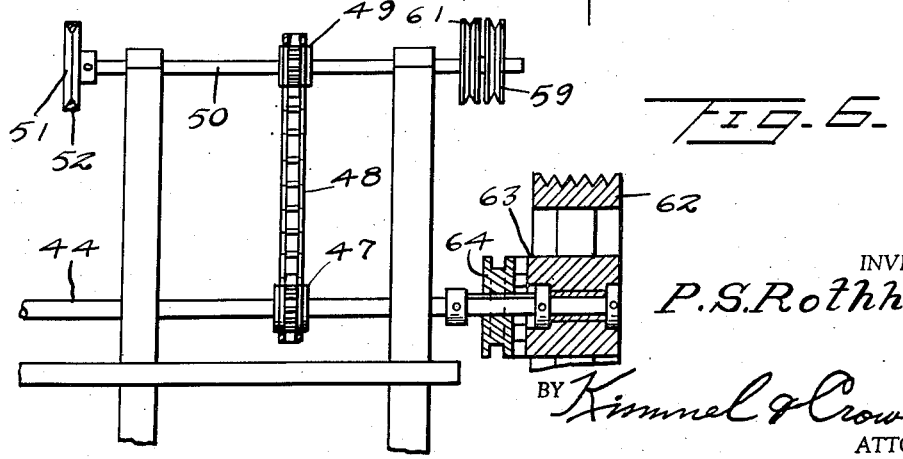
Figure 6 is a fragmentary sectional view taken on the line 6—6 of Figure 1.

Referring to the drawings, the numeral 15 designates generally a frame structure which has a pair of wheels 16 rotatably disposed on each side thereof. The frame 15 has disposed at the rear end thereof an upright post 17 on which a sheller structure generally indicated at 18 is mounted.

The sheller structure 18 includes a pair of horizontal arms 19 and 19' loosely mounted on the post 17 between upper and lower collars 20 and 21, and a pin 22 extends through arm 19 and into the post 17 so as to hold the sheller 18 in operative position over a downwardly inclined chute 23.

The sheller 18 includes a housing 24 within which a sheller drum 25 is rotatably mounted, and the housing 24 has extending from the upper end thereof a hopper 26.

The sheller drum 25 includes a shaft 28 having a grooved pulley 29 fixed thereon.

The housing 24 includes a corn cob discharge chute 24' down which the shelled corn cobs are discharged.

The shelled grain, such as corn, is adapted to drop downwardly into the chute 23 and then flows downwardly and forwardly into a grinder housing 30. The grinder housing 30 has a shaft 31 journalled therethrough with a plurality of plates 32 fixed on the shaft 31.

A plurality of flails 33 are pivotally disposed between pairs of plates 32 and are adapted to strike the grain, such as corn, which is disposed on the upper side of a perforate plate or screen 34. As the corn is ground and passes through the openings 35 in the screen 34, the material drops into a downwardly tapering guide 36 disposed at one end of a screw conveyor housing 37.

The housing 37 has rotatably mounted therein a screw conveyor 38 which constitutes a transfer conveyor whereby the ground material is moved horizontally from beneath the grinder 30 to the lower end of an elevator housing generally indicated at 39. The elevator housing 39 has disposed therein a screw elevator conveyor 40, and housing 39 extends upwardly and terminates in the lower portion of a mixing hopper 41 having a tapered lower portion 42. The upper end of screw conveyor 40 has a grooved wheel 43 secured therethrough which is operated as will be hereinafter described.

The elevator housing 39 is formed in two sections, such as lower section 39a and upper section 39b which is supported in hopper 41 by bolts 27.

A drive shaft 44 is journalled in bearings 45 carried by upstanding supports 46 and the forward end of shaft 44 is adapted to be connected to the power take-off of a tractor (not shown) or the like.

Shaft 44 has fixed thereon a sprocket wheel 47 about which a chain 48 engages, and chain 48 also engages about a sprocket 49 fixed to a counter-shaft 50. Shaft 50 has fixed thereon a grooved pulley 51 about which a belt 52 engages and belt 52 is twisted and engages about a horizontal pulley 53 secured to the lower end of vertical shaft 54.

The upper end of shaft 54 has fixed thereon a grooved pulley 55 about which a belt 56 engages and belt 56 engages about pulley 43.

Transfer conveyor screw 38 has a grooved pulley 57 secured at one end thereof about which a belt 58 engages and belt 58 engages about a pulley 59 fixed on shaft 50. An endless belt 60 engages about a pulley 61 mounted on shaft 50 adjacent pulley 59.

The grinder 30 is selectively operated by means of a multi-grooved pulley 62 which is loosely disposed on shaft 44. Pulley 62 is formed with one part 63 of a clutch and the other part 64 of the clutch is slidable but non-rotatable on shaft 44.

Shaft 30 has fixed thereon a multi-grooved pulley 65 and a plurality of belts 66 engage about the pulleys 62 and 65.

The hopper 41 is provided in the lower portion thereof with a discharge nipple 67 which is downwardly and forwardly inclined and a closure plate 68 is hingedly secured as at 69 to the nipple 67.

In the use and operation of this invention, the corn which is on the cob is discharged into the hopper 26 and the corn is removed from the cobs by the toothed sheller drum 25. The shelled corn drops downwardly from sheller housing 24 into chute 23 and gravitatingly moves downwardly into grinder 30.

The chute 23 extends laterally from sheller 18 so that other grain may be discharged into the chute as the shelled corn drops from housing 24 into the chute and the several grains will then pass into the grinder housing 30 and will be ground together.

The ground material passing through the screen 34 will be transferred horizontally by the transfer screw 38 to the lower end of elevator screw 40, and the elevated grain will be discharged from the upper end of elevator housing 39 into hopper or receiver 41.

The space 70 between the housing sections 39a and 39b provides for initially discharging the ground material into the lower portion of hopper 41, and as hopper 41 gradually fills up with the material engaging above the lower end of housing section 39b the material will be elevated in section 39b and discharged from the upper end of section 39b into hopper 41. In this manner the material will be continually mixed in hopper 41.

With a combination grinder and feed mixer as hereinbefore described, the feed may be ground and mixed as may be desired at the point where the feed is to be delivered to the animals.

This structure will provide a convenient machine which will perform the several operations as a single operation thereby saving substantial material and time which is presently required by first shelling the corn, then transferring the corn to the grinder, and then transferring the ground corn to a mixing means, and finally to a receiver or storage element.

What is claimed is:

In the combination of, a mobile frame, a corn sheller on said frame, a grinder on said frame with said grinder including a plurality of pivoted flails, a chute below said sheller communicating with said grinder, a receiver carried by said frame, means conveying the ground material from said grinder to a point under said receiver, a power shaft rotatably carried by said frame, flexible drive connections between said sheller, said grinder, said conveying means, and said drive shaft; a combined mixer and conveyor comprising a tube extending from said first conveyor to the bottom of said receiver, a second tube axially aligned with said first tube, means mounting said second tube in said receiver in spaced relation to the walls of said receiver and with the bottom of said second tube substantially spaced from the top of said first tube and the bottom of said receiver, a spiral screw extending from the bottom of said first tube to the top of said second tube through said tubes, and means extending from said power shaft for rotating said screw so that said screw will convey material from said conveyor to said receiver through said first tube and simultaneously convey material from the bottom of said receiver to the top of said receiver through said second tube whereby material in said receiver will be continuously mixed.

References Cited in the file of this patent

UNITED STATES PATENTS

| Number | Name | Date |
|---|---|---|
| 1,720,360 | Haines | July 9, 1929 |
| 1,829,325 | Alfred | Oct. 27, 1931 |
| 2,023,644 | Myers | Dec. 10, 1935 |
| 2,047,599 | Snyder | July 14, 1936 |
| 2,081,552 | Myers | May 25, 1937 |
| 2,222,380 | Statler | Nov. 19, 1940 |
| 2,546,747 | Herr | Mar. 27, 1951 |
| 2,557,344 | Erickson | June 19, 1951 |